W. H. DAVIS.
Fruit and Lard Presses.
No. 142,329.　　　　　　　　　　　Patented September 2, 1873.
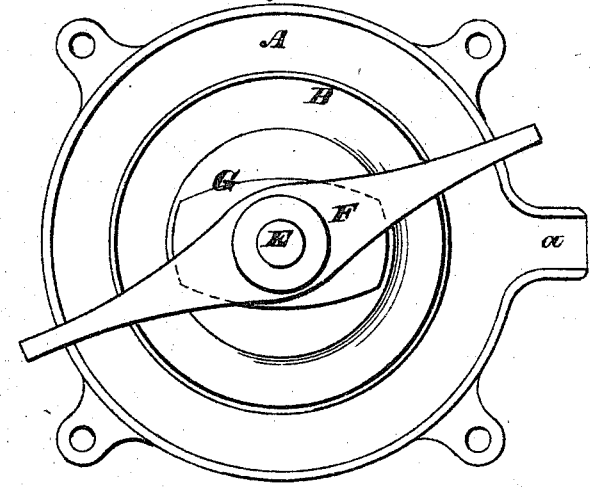
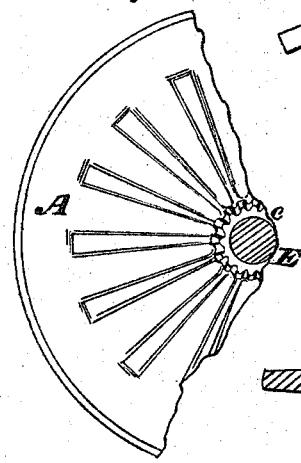
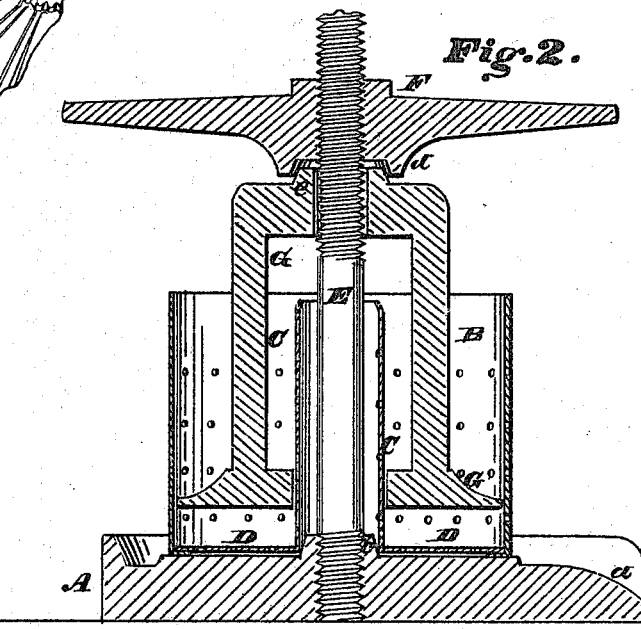
Attest:　　　　　　　　　　　　Inventor:

UNITED STATES PATENT OFFICE.

WILLIAM H. DAVIS, OF LEXINGTON, INDIANA, ASSIGNOR TO JOSEPH HARLAN, OF SAME PLACE.

IMPROVEMENT IN FRUIT AND LARD PRESSES.

Specification forming part of Letters Patent No. 142,329, dated September 2, 1873; application filed May 17, 1873.

*To all whom it may concern:*

Be it known that I, WILLIAM H. DAVIS, of Lexington, in the county of Scott and State of Indiana, have invented certain Improvements in Screw-Presses, of which the following is a specification:

My invention relates to the construction of a cheap, simple, and durable press, to be used for pressing fruits, lard, &c. An important feature consists in a peculiar construction of the press-chamber to facilitate the removal of the cake left after pressing.

Figure 1 is a plan of the press. Fig. 2 is a vertical mid-section of the same. Fig. 3 is a broken plan of the press-base, showing the corrugations thereon.

Let A represent the base of the press; B, the perforated outer wall of the chamber; C, an inner perforated tube, to which a perforated bottom, D, is attached, the latter resting on a flange turned inward on the lower edge of the outer wall B. The base of the press has radial corrugations (see Figs. 2 and 3) raised upon its surface, and upon these the chamber rests. The channels between the corrugations lead the expressed liquid to the spout $a$. The base is also provided with suitable lugs for attaching it to a bench or table.

As will be seen from Figs. 2 and 3, there rises from the center of the base A a small fluted cone, $c$, which is encircled by the lower end of the tube C. This cone serves to guide the tube to its place and to keep it there.

In the center of the base A is rigidly secured a stout screw, E, of suitable length. This screw is perpendicular to the base. F is a nut, threaded to fit the screw E, and provided with handles of any desired length. This nut has a conical depression, $d$, in its lower face to engage with a corresponding projection, $e$, on the follower G. The form of the follower is clearly shown in the drawings and needs no special description. By erecting a screw in the center of the base, and securing it rigidly thereto, and causing the nut to run down upon the plunger, I avoid the usual frame-work necessary in a press where the screw travels; and I also, by the use of a follower with a conical bearing in the nut, and guided by the central tube, get a more even and level bearing on the mass to be pressed than can be obtained with the ordinary screw-press. After the liquid is pressed out, the cake may be removed by drawing out the central tube C, which brings the mass with it. The cake may then be broken away.

I claim—

1. A press-chamber composed of the outer perforated wall B, provided with an inner flange, and an inner perforated tube, C, bearing a perforated bottom, D, arranged to rest upon the above-named flange, in the manner as shown, and for the purpose specified.

2. In combination with the tube C, the fluted cone $c$, or its equivalent, operating substantially as shown, and for the purposes specified.

Witness my hand this 29th day of April, 1873.

WILLIAM H. DAVIS.

Witnesses:
HENRY CONNETT, Jr.,
JAS. A. HUTCHINGS.